United States Patent [19]

Tamagawa et al.

[11] Patent Number: 5,341,245
[45] Date of Patent: Aug. 23, 1994

[54] OPTICAL APPARATUS FOR IMAGE SCANNING

[75] Inventors: Kiyomi Tamagawa; Akira Yoda, both of Kanagawa, Japan

[73] Assignee: Fuji Photo Film Co., Ltd., Kanagawa, Japan

[21] Appl. No.: 30,914

[22] Filed: Mar. 15, 1993

[30] Foreign Application Priority Data

Mar. 13, 1992 [JP] Japan .................................. 4-055356
Mar. 13, 1992 [JP] Japan .................................. 4-055357

[51] Int. Cl.$^5$ ...................... G02B 26/08; G01N 21/88
[52] U.S. Cl. .................................. 359/739; 359/205; 250/562
[58] Field of Search .............. 359/205, 206, 389, 737, 359/738, 739, 740, 798, 799, 885, 888, 893; 250/202, 271, 555, 556, 557, 562, 571, 572

[56] References Cited

U.S. PATENT DOCUMENTS 4,168,512  9/1979  Ito et al. .............................. 359/739
4,972,091  11/1990 Cielo et al. ........................... 250/562

Primary Examiner—Loha Ben
Assistant Examiner—Michael A. Papalas
Attorney, Agent, or Firm—Sughrue, Mion, Zinn, Macpeak & Seas

[57] ABSTRACT

An optical apparatus for image scanning for reading image information recorded on an original by irradiating the original with reading light and reading the light transmitted through or the light reflected from the original using a photoelectric converter. In the optical apparatus for image scanning, a light source irradiates the original with the reading light. A slit is disposed between the light source and the original so as to control a range where the original is irradiated with the reading light. Condenser lenses are disposed between the slit and the original so as to concentrate the reading light transmitted through the slit on an image reading portion of the original. The photoelectric converter receives the reading light from the original and converts the received light into an electric signal. Another condenser lens is disposed between the original and the photoelectric converter so as to converge the reading light from the original on the photoelectric converter.

11 Claims, 16 Drawing Sheets

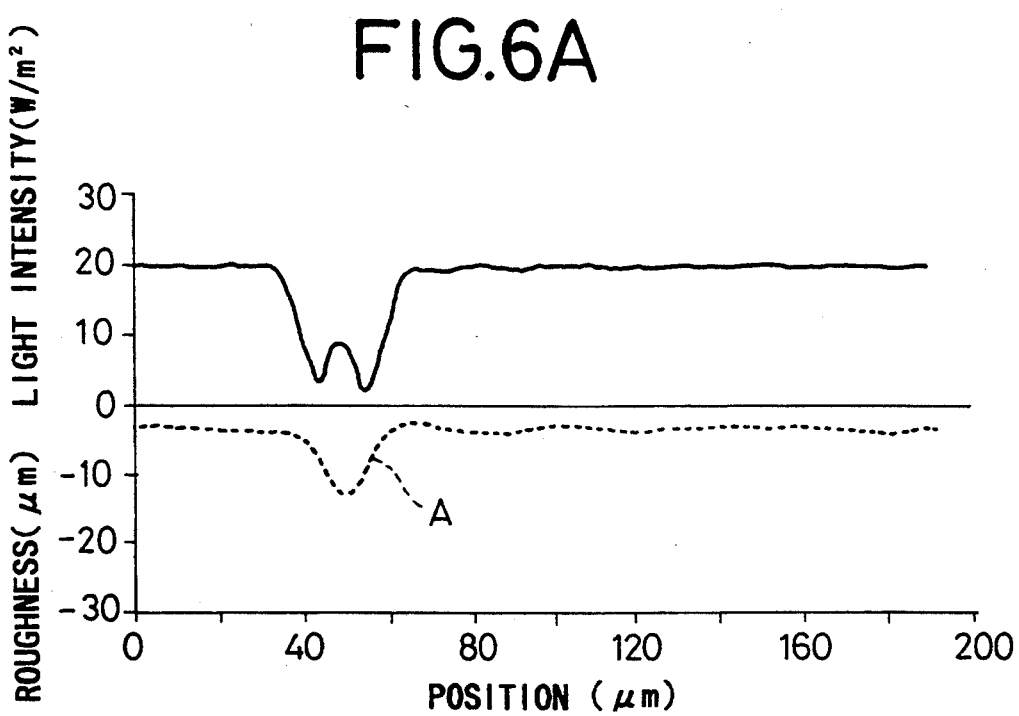
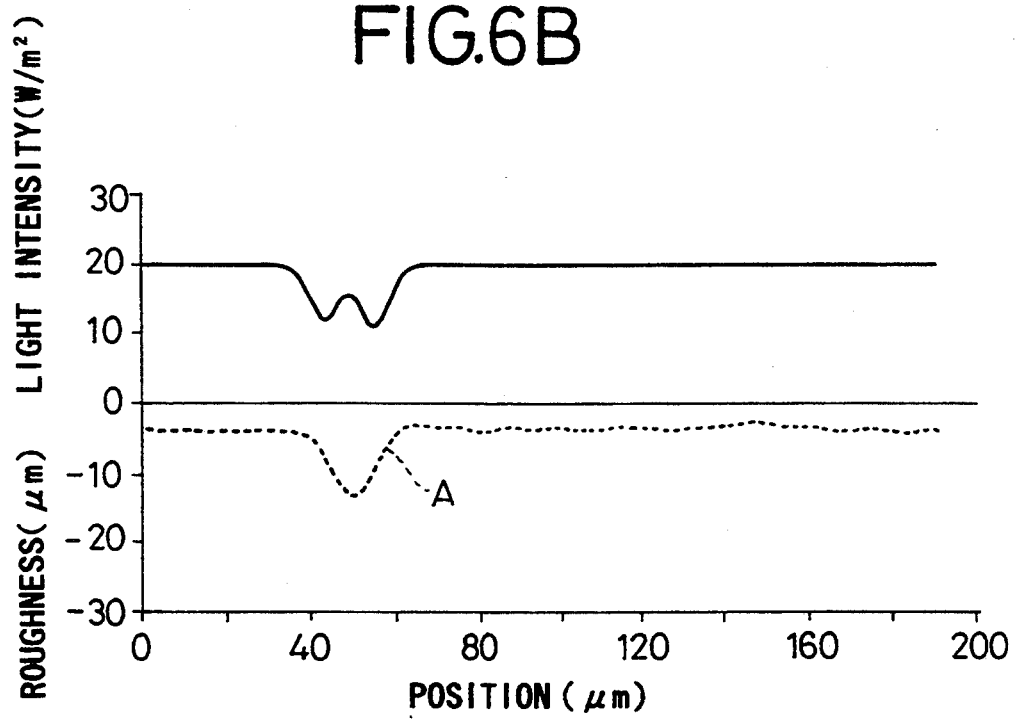

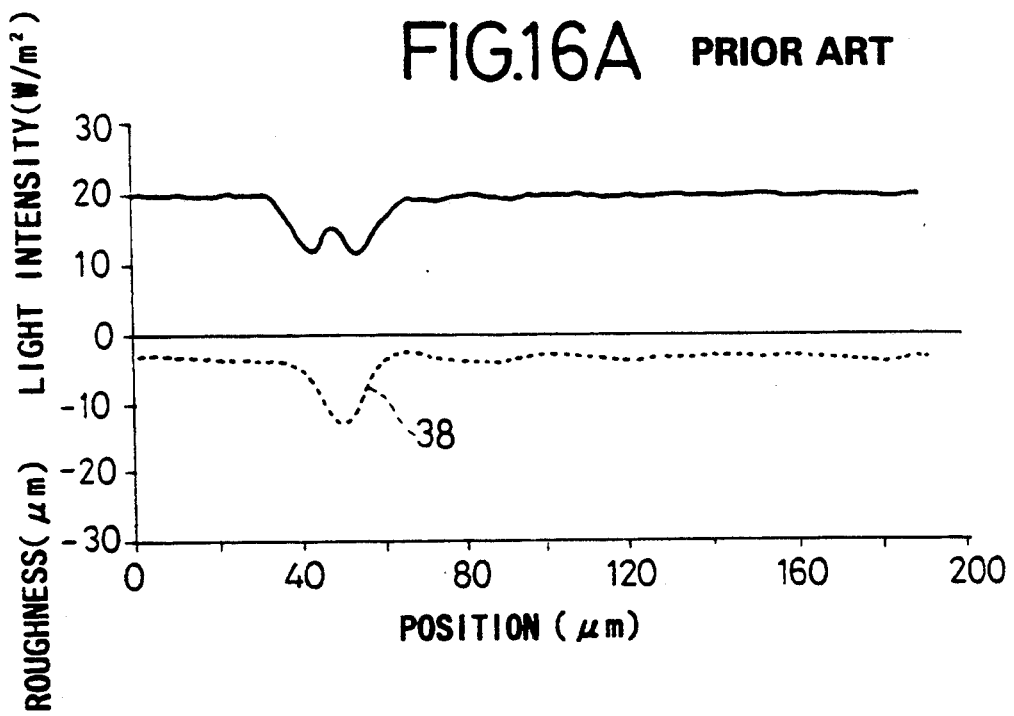
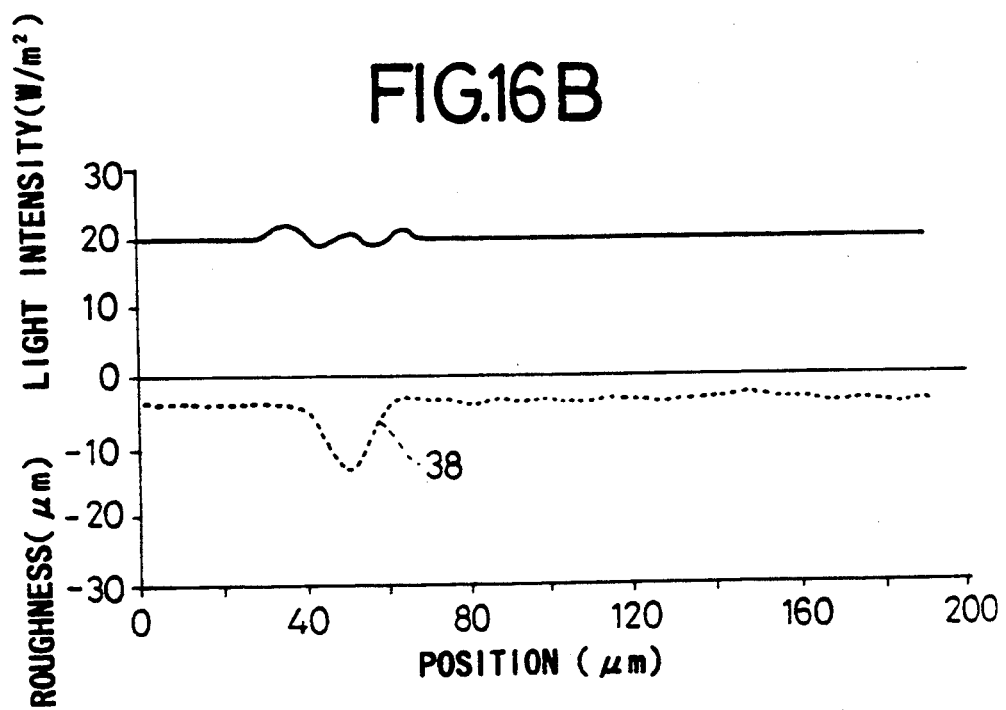

OPTICAL APPARATUS FOR IMAGE SCANNING

BACKGROUND OF THE INVENTION

1. Field of the Invention

The present invention relates to an optical apparatus for image scanning for reading image information recorded on an original by irradiating light thereto and receiving either the light transmitted therethrough or the light reflected therefrom by a photoelectric conversion means.

2. Description of the Related Art

Heretofore, an image scanning apparatus has widely been used which photoelectrically reads image information recorded on an original such as a film and optionally processes the so-read image information to produce separation films for printing or to platemaking.

In an optical apparatus for image scanning used in this type of image scanning apparatus, a line sensor shown in FIG. 1, for example, has been used for the sake of the resolution capabilities and the reading rate. To utilize the line sensor, it is necessary to illuminate an elongated region extending along the longitudinal direction of the line sensor. It is therefore preferable to employ an elongated light source 2. In FIG. 1, reading light L is emitted from the light source 2 which is elongated in the direction (i.e., a main scanning direction) perpendicular to the sheet paper. The emitted light is focused, or concentrated in width in an auxiliary scanning direction perpendicular to the main scanning direction by a slit 4, onto an original F bearing image information recorded thereon. The original F is contained in a film cassette 6. In the film cassette 6, the original film F is placed between support glass plates 8a and 8b through which the reading light L passes. The film cassette 6 is moved in the direction indicated by the arrow X for auxiliary scanning. Then, the reading light L having passed through the original F is focused by a reading lens 10, and then introduced into a CCD line sensor 12. The CCD line sensor 12 has a plurality of sensor elements in an alignment along the main scanning direction, which converts the reading light into an electric signal corresponding to the image information.

The density of a color reversal film, which is normally used as an original, ranges in the order of 0 to 4.0 expressed in the optical density. In order to accurately measure a density of an original having an optical density of 2 or higher, it is necessary to suppress undesirable flare coming from other than pixels to be read to a level 1/1000 to 1/20000 times the level of the necessary image light.

The width of the sensor alignment of the CCD line sensor 12 corresponds to the width of one pixel (normally 7 μm to 10 μm) in an alignment of pixels extending in the auxiliary scanning direction (i.e., in the direction of arrow X). Thus, when the reading light L falls on a region other than the region where the photoelectric converter elements are, it tends to cause a flare which deteriorates the quality of the read image. In order to avoid such inconvenience, there is provided a slit 4 for limiting the width of the reading light L spreading in the auxiliary scanning direction.

It is necessary for a high-density original to be reproduced precisely to set the width of the reading light L to less than 50 times the width of the sensor alignment of the CCD line sensor 12, preferably less than 20 times, and more preferably less than 10 times the width thereof.

However, the reading light L transmitted through the slit 4 tends to be influenced by surface roughness of the original film in the auxiliary scanning direction, since the exit direction of the reading light L from the slit 4 is limited within a predetermined range and the numerical aperture of the slit 4 in the auxiliary scanning direction is small. A problem has been pointed out that a portion of the reading light L is scattered by the surface roughness of, for example, scratches or dust on the support glass plates 8a and 8b of the film cassette 6 or the original F, or non-glare glass used as the support glass plates 8a and 8b, and that this surface roughness clearly appear on the resultant image.

SUMMARY OF THE INVENTION

Since the present invention has been made to solve the foregoing problem, the object of the present invention is to provide an optical apparatus for image scanning wherein the problem of flare in particular has been solved, the effects of surface roughness such as scratches and dust have been reduced, thereby to make it possible to obtain satisfactory image information under the use of a line sensor.

According to a first aspect of the present invention, for achieving the above object, there is provided an optical apparatus for image scanning comprising a light source for irradiating an original having image information recorded thereon with reading light, a slit disposed between the light source and original for controlling a region of the original to be irradiated with the reading light, condenser means A disposed between the slit and original for concentrating the reading light transmitted through the slit at a region of the original to be read, photoelectric conversion means for receiving the reading light from the original and converting received reading light into an electric signal, and condenser means B disposed between the original and photoelectric conversion means for concentrating the reading light from the original at the photoelectric conversion means.

In the optical apparatus for image scanning according to the first aspect of the present invention, the reading light emitted from the light source is introduced into the condenser means A through the slit. Then, a slit image is formed on the original through the condenser means A. The condenser means B focuses the reading light transmitted through or reflected from the original on the photoelectric conversion means, where the focused light is converted into the electric signal. Here, the occurrence of the flare can be avoided by limiting the width of the reading light spreading in an auxiliary scanning direction by use of the slit and the condenser means A and B, and introducing the light having a narrow width into the photoelectric conversion means. Further, scratches, dust, surface roughness, etc. can be made nonprominent by irradiating the original with the reading light produced as a beam of light concentrated by the condenser means A and focusing the light by the condenser means B whose numerical aperture is set smaller than that of the condenser means A.

Further, according to a second aspect of the present invention, there is provided an optical apparatus for image scanning comprising a light source for irradiating an original with image information recorded thereon with reading light, condenser means C for concentrating the reading light, condenser means D having a front focal point at a point where the reading light is concentrated by the condenser means C, and for concentrating the reading light at the original, a filter B disposed between the light source and original, for controlling a spatial distribution of the quantity of the reading light, photoelectric conversion means for receiving the reading light from the original and converting the received light into an electric signal, and condenser means E disposed between the original and photoelectric conversion means, for concentrating the reading light from the original at the photoelectric conversion means.

Furthermore, according to a third aspect of the present invention, for achieving the above object, there is provided an optical apparatus for image scanning comprising a light source for irradiating an original having image information recorded thereon with reading light, a filter B disposed between the light source and original, for controlling a spatial distribution of the quantity of the reading light, the filter B comprising a darkening region spreading within a predetermined region about the optical axis of the reading light incident on the original, and a light-transmissive region which is other than the dimming region of the filter B, the dimming region having a predetermined darkening characteristic, photoelectric conversion means for receiving the reading light from the original and converting the received light into an electric signal, and condenser means B disposed between the original and photoelectric conversion means, for concentrating the reading light from the original at the photoelectric conversion means, the condenser means B having a numerical aperture which is not greater than the numerical aperture substantially corresponding to the dimming region of the filter B.

In each of the optical apparatus for image scannings according to the second and third aspects of the present invention, the reading light emitted from the light source is focused on the front focal point of the condenser means A by the condenser means C. Then, the light-intensity distribution is controlled by the filter. The reading light is concentrated at the original through the condenser means A. Further, the condenser means B concentrates the reading light from the original at the photoelectric conversion means, where the light is converted into the electric signal. Preferably, the reading light transmitted through the central portion of the filter is dimmed to a predetermined intensity and sent to the original. Further, the reading light, which has passed through the peripheral portion other than the central portion of the filter, is sent to the original without being dimmed. On the other hand, the reading light from the original is focused by the condenser means B having the numerical aperture smaller than the numerical aperture for the reading light which passes through the peripheral portion of the filter. The focused light is introduced into the photoelectric conversion means, where it is converted to the electric signal.

When the original has scratches, the reading light is refracted at the scratches, and thus, a portion of the reading light does not enter into the condenser means B. However, the reading light, which has not been dimmed by the filter, newly enters into the condenser means B. Accordingly, the reading light passes through the condenser means B without being dimmed due to the scratches or the like and is then introduced into the photoelectric conversion means. As a result, the scratches or the like can be made nonprominent.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIGS. 6A and 6B are respective views for describing the simulation of the optical apparatus for image scanning shown in FIG. 2;

FIGS. 16A and 16B are respective views for describing a comparison by simulation between the conventional optical apparatus for image scanning and the optical apparatus for image scanning shown in FIG. 10;

DETAILED DESCRIPTION OF THE PREFERRED EMBODIMENTS

Optical apparatus for image scannings according to the present invention will hereinafter be described in detail with reference to the accompanying drawings in which preferred embodiments are shown by way of illustrative example.

Figure 1:
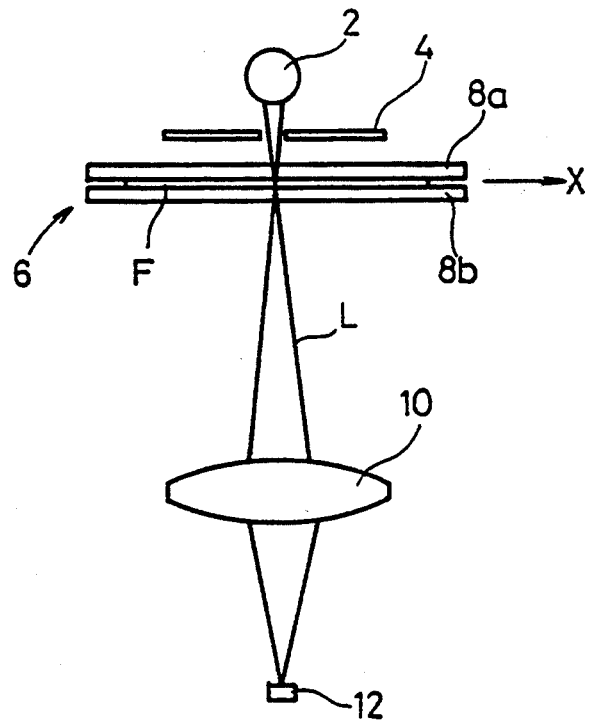
FIG. 1 is a view showing the structure of a conventional optical apparatus for image scanning.
Figure 2:
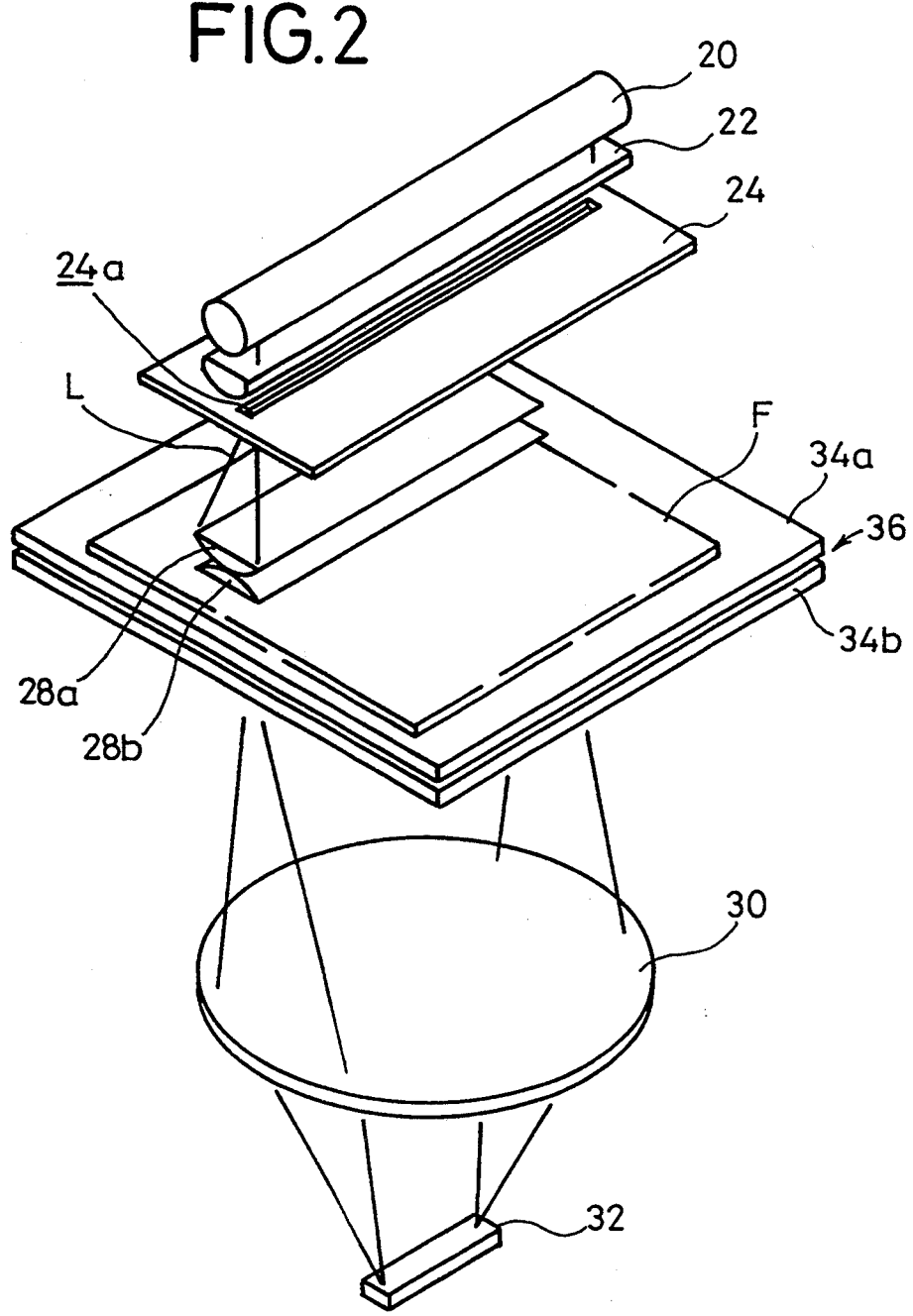
FIG. 2 is a perspective view illustrating the structure of an optical apparatus for image scanning according to a first embodiment of the present invention.
Figure 3:
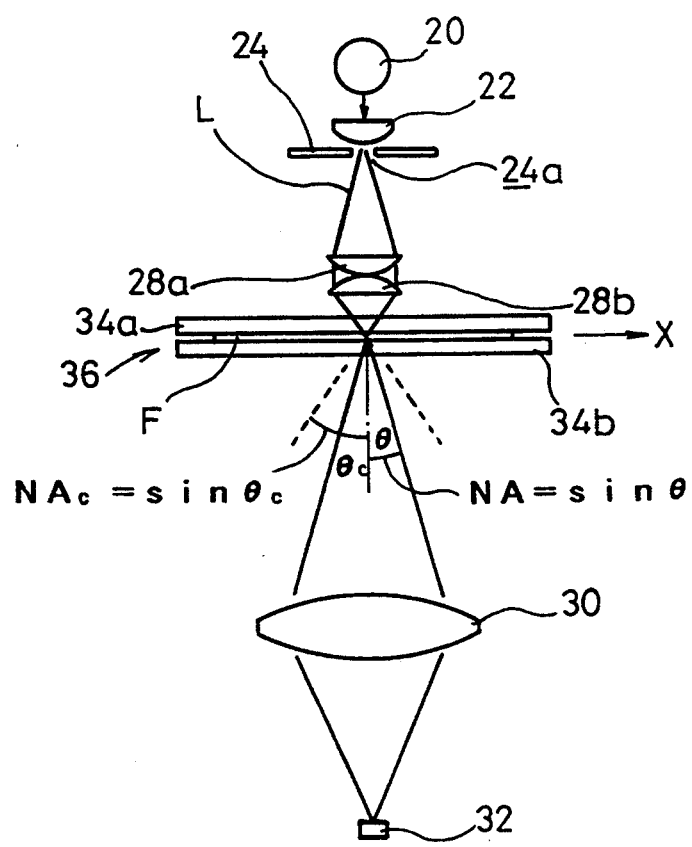
FIG. 3 is a side view depicting the structure of the optical apparatus for image scanning shown in FIG. 2.

FIGS. 2 and 3 respectively show an optical apparatus for image scanning according to a first embodiment, which is to be incorporated into an image scanning apparatus. The optical apparatus for image scanning comprises a light source 20, an auxiliary condenser lens 22 shaped in the form of a cylindrical lens, slit members 24, condenser lenses (condenser means A) 28a and 28b each shaped in the form of a cylindrical lens, a reading lens (condenser means B) 30, and a CCD line sensor (photoelectric conversion means) 32. Here, the light source 20, the auxiliary condenser lens 22, a slit 24a defined between the slit members 24, the condenser lenses 28a and 28b and the CCD line sensor 32 are respectively elongated in a main scanning direction (i.e., in the direction perpendicular to the sheet paper of FIG. 3). Further, the auxiliary condenser lens 22 and the condenser lenses 28a and 28b concentrate the reading light L emitted from the light source 20 only in an auxiliary scanning direction (i.e., in the direction indicated by the arrow X) having an optical axis in common. A film cassette 36 is disposed between the condenser lenses 28a and 28b and the reading lens 30, in which an original F bearing image information recorded thereon is held between a pair of support glass plates 34a and 34b which are non-glare glass plates.

The non-glare glass has an irregular or uneven surface for preventing Newton's rings from being produced due to multiple reflections repeated between the surfaces of the film and glass. As a normally available non-glare glass, there is known one in which the magnitude of unevenness of the surface ranges from 0.2 $\mu$m to 5 $\mu$m and its pitch is of the order of 5 $\mu$m to 150 $\mu$m. This type of non-glare glass is essential for a CCD line sensor of a plane transmissive reading scanner type.

The width of a slit image of the slit 24a on the original F formed by the condenser lenses 28a and 28b is set to about 0.2 mm, preferably about 0.1 mm, more preferably about 0.03 mm in the first embodiment. Further, the numerical aperture NAc of each of the condenser lenses 28a and 28b is set so as to be larger than the numerical aperture NA of the reading lens 30 (see FIG. 3). It is preferable to set the NAc as follows:

$$NAc \geq NA + 0.1$$

More preferably, NAc is expressed as follows:

$$NAc \geq NA + 0.2$$

Operations and advantageous effects of the optical apparatus for image scanning basically constructed as described above according to the present invention will next be described.

The reading light L emitted from the light source 20 is focused in the auxiliary scanning direction (i.e., in the direction indicated by the arrow X) by the auxiliary condenser lens 22. Thereafter, the reading light L is introduced into the condenser lenses 28a and 28b through the slit 24a. The condenser lenses 28a and 28b concentrate the reading light L at the original F through the support glass plate 34a so as to form a slit image. In the first embodiment, the numerical aperture NAc can be set to a value in a range from 0.05 up to 0.4 by using the condenser lenses 28a and 28b each having a focal length of 7.5 mm and a width of 10 mm and by varying an unillustrated brightness diaphragm. The numerical aperture NA of the reading lens 30 is set to a value selected in a range from 0.05 to 0.1. The length of each of the condenser lenses 28a and 28b is set to 200 mm to read an original F having dimensions of 4 inches by 5 inches.

Further, the reading light L, which has passed through the original F and is bearing the image information is introduced into the reading lens 30 through the support glass plate 34b, and then focused on the CCD line sensor 32. The CCD line sensor 32 converts the reading light L into an electric signal and transmits the electric signal thus converted to an unillustrated image processing circuit of the image scanning apparatus as image data.

Figure 4A:
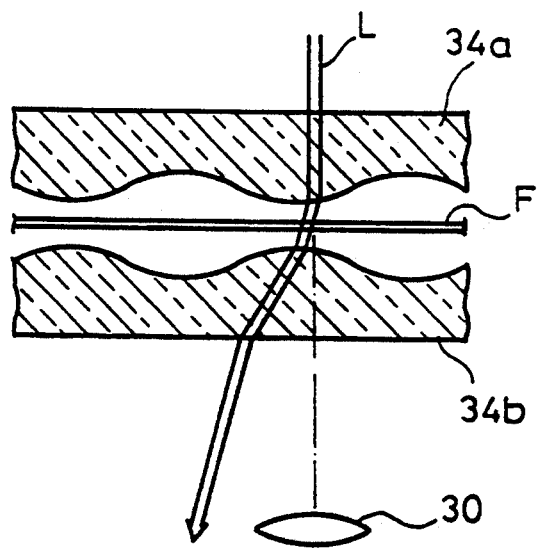
FIGS. 4A and 4B are respectively views for describing a comparison between the conventional optical apparatus for image scanning and the optical apparatus for image scanning shown in FIG. 2.
Figure 4B:
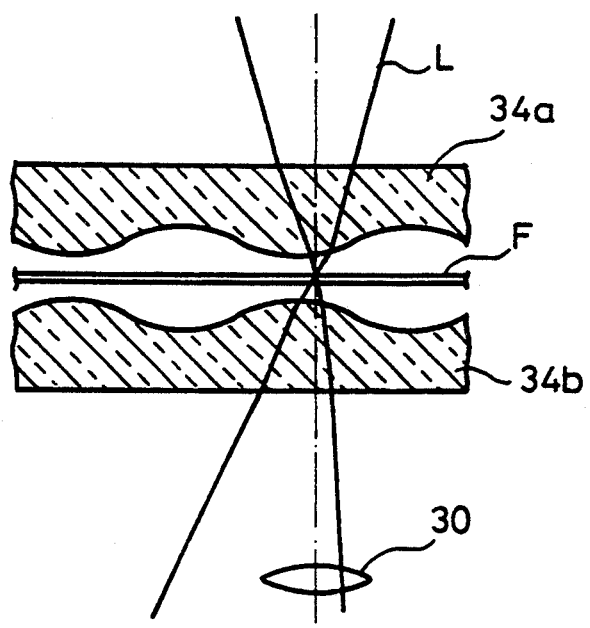

Now, consider that the support glass plates 34a and 34b are composed of non-glare glass having an uneven surface, for example. When the reading light L is of a parallel beam of the light as shown in FIG. 4A, the optical path of the reading light L is completely deviated from the reading lens 30 by refraction. Thus, dark spots are produced in image data and the unevenness of the support glass plates 34a and 34b are made distinct. When, on the other hand, the condenser lenses 28a and 28b applied to the first embodiment are used, the reading light L is concentrated at the original F so as to form a slit image as shown in FIG. 4B. Thereafter, the reading light L is transmitted through the original F and enters into the reading lens 30. Since, in this case, at least a portion of the reading light L enters into the reading lens 30, the influence of the unevenness of the support glass plates 34a, 34b on the resultant image data is reduced. Since the numerical aperture NAc of each of the condenser lenses 28a and 28b is set so as to be greater than the numerical aperture NA of the reading lens 30 as shown in FIG. 3 in the first embodiment, the influence of the unevenness of the support glass plates 34a, 34b on the image is further reduced.

FIGS. 5A and 5B and FIGS. 6A and 6B are views respectively showing the relationships between scratches A and the intensity of light which has passed through the non-glare glass plates having the scratches A. The scratches A are indicated by the broken lines in the lower parts of the respective drawings and the resultant intensity of light obtained by simulation are indicated by the solid lines in the upper parts of the respective drawings.

Figure 5A:
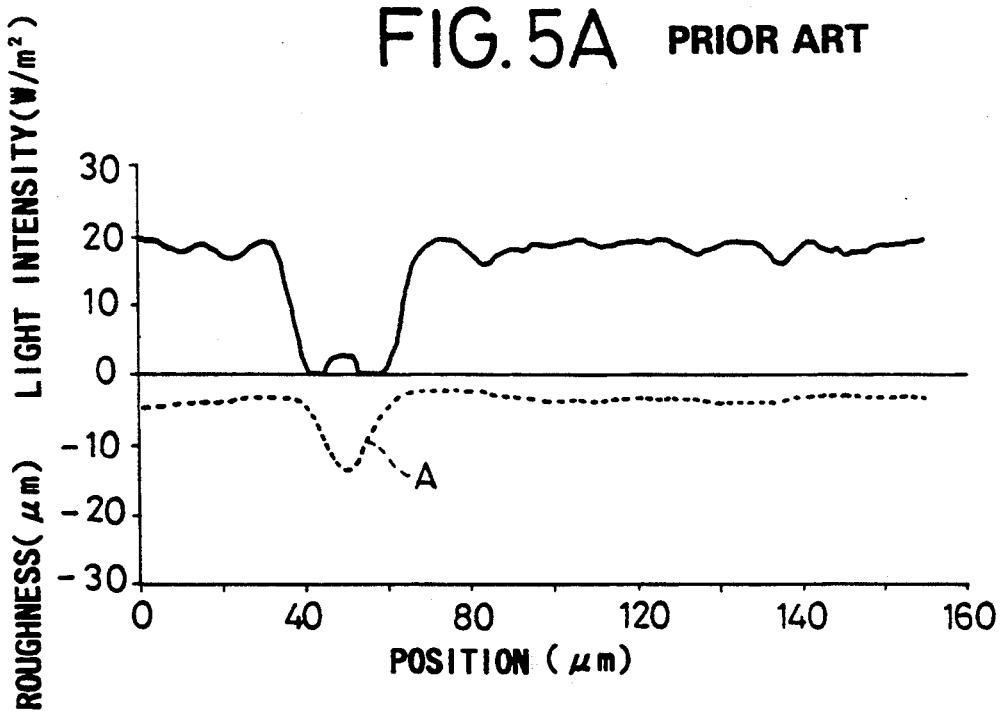
FIGS. 5A and 5B are respective views for describing a comparison by simulation between the conventional optical apparatus for image scanning and the optical apparatus for image scanning shown in FIG. 2.
Figure 5B:
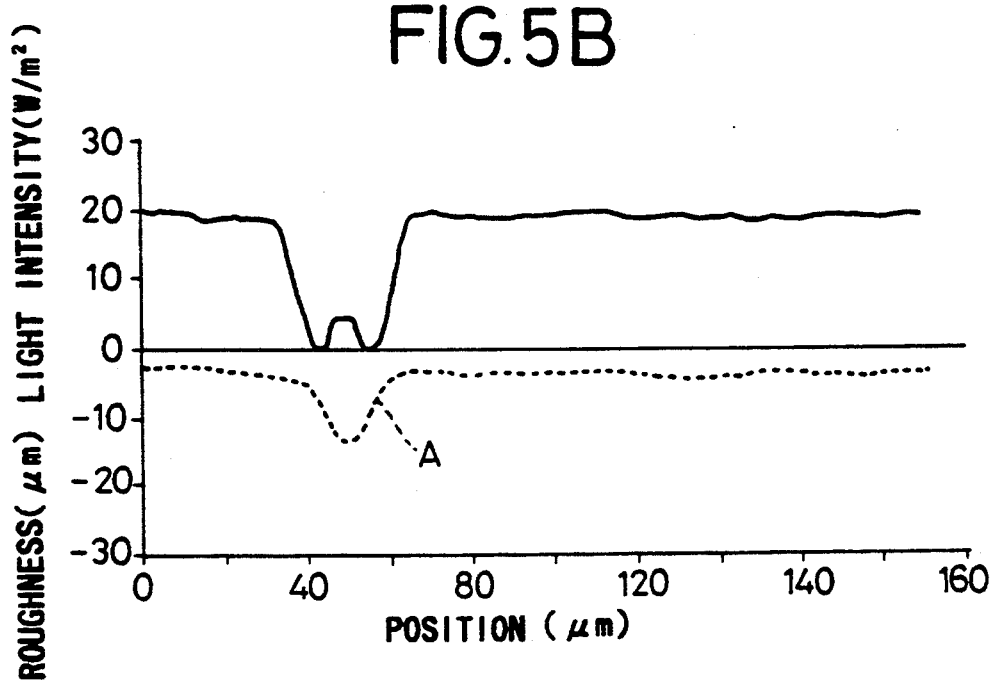

FIG. 5A shows the result of simulation of the light intensity in a case where the condenser lenses 28a and 28b are not used, in which the numerical aperture NAc of the slit 24a is set to 0.05, the numerical aperture NA of the reading lens 30 is set to 0.1 and the refractive index n of the non-glare glass is set to 1.52. FIG. 5B illustrates the result of simulation of the light intensity in which the numerical aperture NAc of each of the condenser lenses 28a and 28b is set to 0.1, the numerical aperture NA of the reading lens 30 is set to 0.1 and the refractive index n of the non-glare glass is set to 1.52. The comparison between both simulation results shown in FIGS. 5A and 5B will next be made. FIG. 5A illustrates that the scratch A, and the surface roughness of the non-glare glass occurring before and after the scratch A, appear as they are. On the other hand, FIG.

5B shows that the scratch A appears substantially as it is but the influence of the unevenness of the non-glare glass are greatly reduced.

FIG. 6A shows the result of simulation of the light intensity in which the numerical aperture NAc of each of the condenser lenses 28a and 28b is set to 0.2, the numerical aperture NA of the reading lens 30 is set to 0.1, and the refractive index n of the non-glare glass is set to 1.52. FIG. 6B illustrates the result of simulation of the light intensity in which the numerical aperture NAc of each of the condenser lenses 28a and 28b is set to 0.4, the numerical aperture NA of the reading lens 30 is set to 0.1, and the refractive index n of the non-glare glass is set to 1.52.

It is understood from the comparison between the simulation results shown in FIGS. 6A and 6B that the influence of the scratch A becomes smaller as the numerical aperture NAc of the condenser lenses 28a and 28b increases as compared with the numerical aperture NA of the reading lens 30, and the influence of the unevenness of the non-glare glass on the image is also reduced.

As described above, the magnitude of unevenness of the non-glare glass ranges from 0.2 $\mu$m to 5 $\mu$m and its pitch is of the order of 5 $\mu$m to 150 $\mu$m. Assuming that both the magnitude and the pitch are represented as a and b respectively, the unevenness f(x) of the surface of the non-glare glass is approximately represented as follows:

$$f(x) = a \cdot \sin(2\pi \cdot x/b)$$

where x = position
The inclination $\Theta$ of the uneven surface is represented as follows:

$$\tan \Theta = f'(x) = 2\pi \cdot a/b \cdot \cos(2\pi \cdot x/b) \quad (1)$$

When the inclination $\Theta$ is small, the maximum inclination $\Theta$ is represented as follows:

$$\Theta_{max} = 2\pi \cdot a/b \quad (2)$$

An angular variation $\Delta\Phi$ in the light which enter into the non-glare glass, can be approximately represented as follows:

$$\Delta\Phi = (n-1)\Theta \quad (3)$$

where n represents the refractive index. The ratio of the amplitude a to the pitch b, i.e., the a/b ratio, generally ranges from 1/40 to 1/30 but substantially ranges from 1/50 to 1/15. In view of the equations (2) and (3), the angular variation $\Delta\Phi$ in the light generally ranges from 0.07 rad to 0.1 rad but substantially falls within a range from 0.06 rad to 0.2 rad.

It is thus understood that the numerical aperture NAc may be set larger by 0.1, preferably larger by 0.2, than the numerical aperture NA of the reading lens 30.

In the first embodiment, the above-described advantageous effects could be confirmed by reading or scanning a color reversal film and actually evaluating an image output in the form of a color separation film.

Incidentally, in the first embodiment, the reduced influence of the unevenness of-the non-glare glass have been described. It is however possible to lessen the influence of scratches, dust, etc. on the original F in the same manner as described above.

In the first embodiment as well, the slit image is formed on the original F through the condenser lenses 28a and 28b and the reading light L emitted from the slit image is focused on the CCD line sensor 32 through the reading lens 30. Therefore, only the necessary reading light L is focused in the auxiliary scanning direction and hence the flare is not likely to occur.

Figure 7:
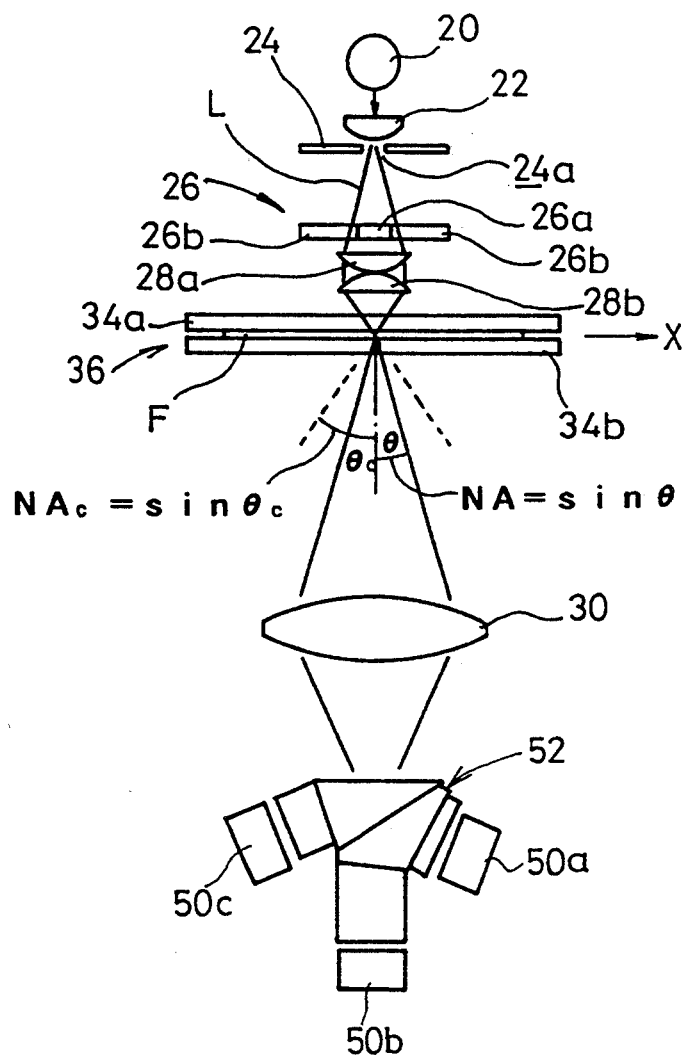
FIG. 7 is a side view showing the structure of an optical apparatus for image scanning according to a second embodiment of the present invention.

A description will next be made with reference to FIG. 7 of a second embodiment which is useful in reading a color original. Incidentally, the same elements of structure as those employed in the first embodiment are identified by the like reference numerals. When an original F such as a color reversal film is read by CCD line sensors 50a through 50c, reading, light L is divided into three colors of R, G and B by a color separation prism 52, for example.

Figure 8:
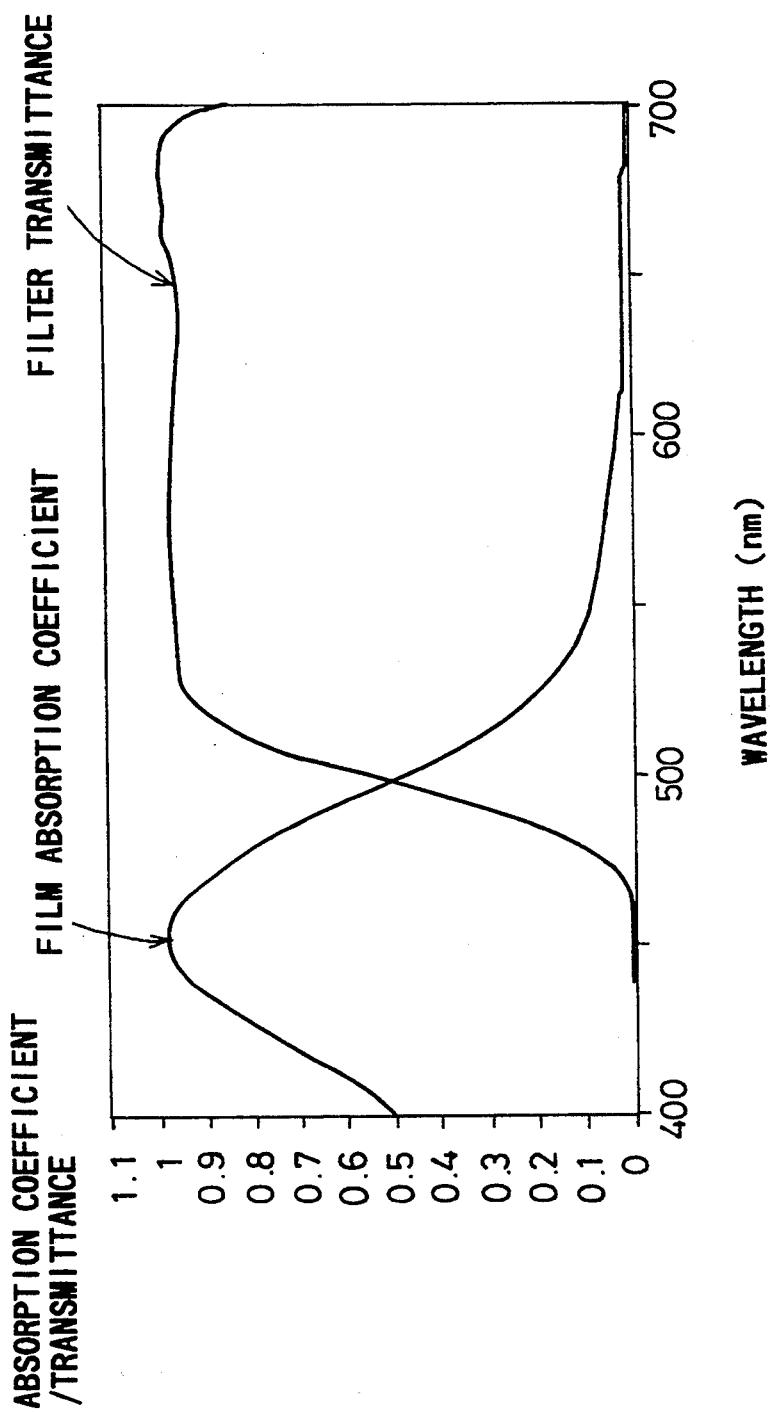
FIG. 8 is a view for describing a characteristic of a filter shown in FIG. 7.

In this case, a read image, which has less roughness and is more desirable, can be obtained by varying an illumination numerical aperture with respect to each color light. Described specifically, a filter 26 (filter A) is inserted between the slit member 24 and condenser lenses 28a and 28b as shown in FIG. 7. The filter 26 has a central portion 26a which is transparent along a main scanning direction, and both side portions 26b which allow only the yellow (Y) light to pass therethrough (see a characteristic diagram shown in FIG. 8). Thus, the range at which the blue (B) light of the reading light L enters into each of the condenser lenses 28a and 28b, is set narrower. On the other hand, the green (G) and red (R) light is set to the aforementioned aperture condition.

Figure 9:
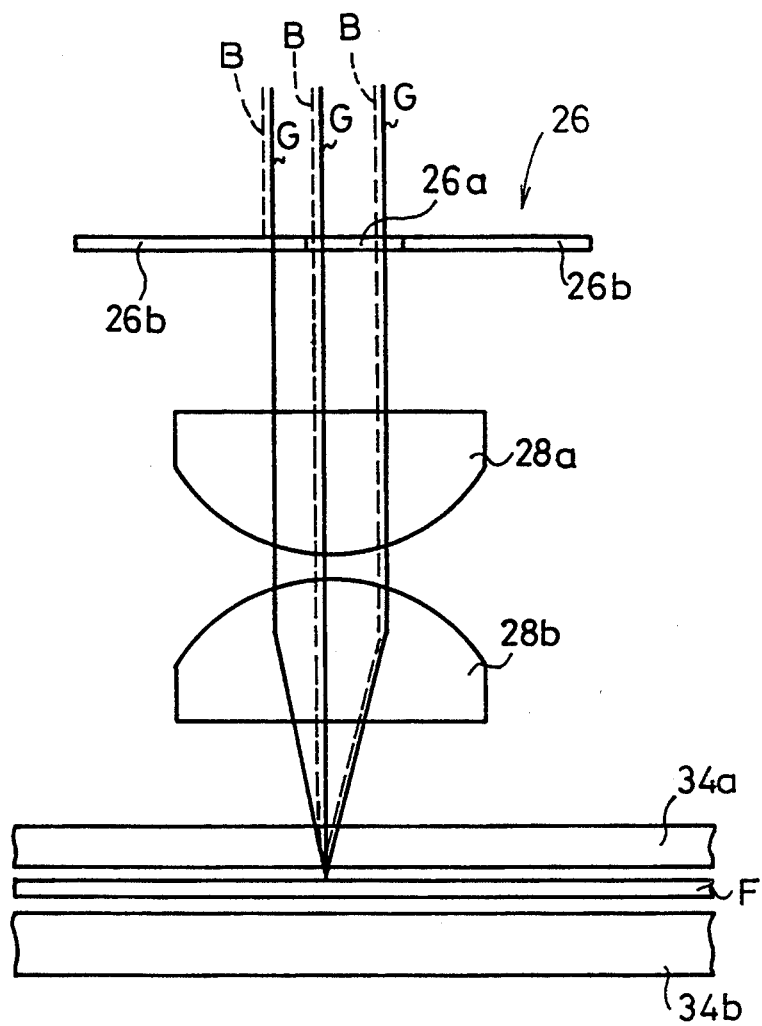
FIG. 9 is a view for describing a principal part of the optical apparatus for image scanning shown in FIG. 7.

Since the numerical aperture NAc of each of the condenser lenses 28a and 28b to which the blue (B) light enters, becomes small, yellow (Y) components on the original F are read and the blue (B) light enters into the CCD line sensor 50c used as a B channel without being subjected to a noise reduction (see FIG. 9). Each of particles of the yellow (Y) components on the original F is larger in size than each of those of the magenta (M) and the cyan (C) and the roughness of each particle tends to be noticeable. Thus, there is a case in which the yellow particles are reversely enhanced or emphasized when the noise caused by the unevenness of the glass or film is reduced, which is not necessarily desirable. When, on the other hand, only the yellow light is applied in a state the numerical aperture has been reduced, the roughness of the particles can be made rather nonprominent than the above due to the yellow (Y) components and the unevenness of the non-glare glass. Incidentally, noise processing with respect to other dyes can also be effected by selecting the filter 26 as needed.

Figure 10:
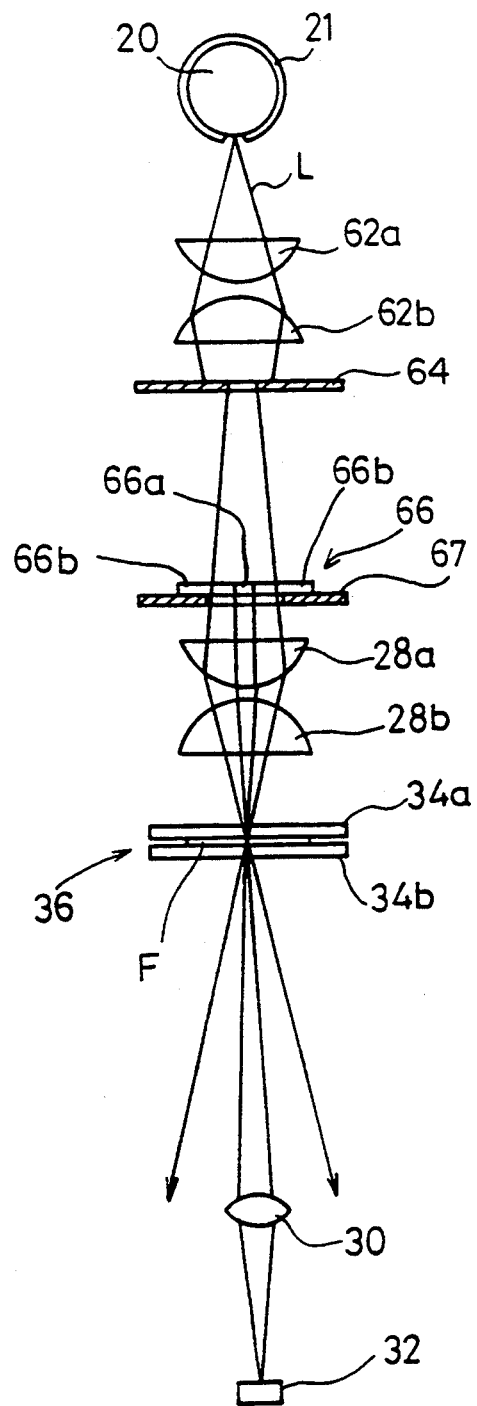
FIG. 10 is a side view showing the structure of an optical apparatus for image scanning according to a third embodiment of the present invention.

FIG. 10 shows an optical apparatus for image scanning according to a third embodiment, which is to be incorporated into an image scanning apparatus. Incidentally, the same elements of structure as those employed in the first and second embodiments are identified by like reference numerals in the following description.

The optical apparatus for image scanning comprises a light source 20 having an aperture 21 defined therein, auxiliary condenser lenses 62a and 62b (condenser means C) shaped in the form of a cylindrical lens, a field diaphragm 64, a filter 66 (filter B), a brightness diaphragm 67, condenser lenses (condenser means A) 28a and 28b shaped in the form of a cylindrical lens, a reading lens (condenser means B) 30, and a CCD line sensor (photoelectric conversion means) 32. These components are arranged on the common optical axis. The light source 20, the auxiliary condenser lenses 62a and 62b, the field diaphragm 64, the filter 66, the brightness diaphragm 67, and the condenser lenses 28a and 28b are respectively elongate in a main scanning direction (i.e., in the direction perpendicular to the sheet paper of FIG. 10). The auxiliary condenser lenses 62a and 62b and the condenser lenses 28a and 28b serve to focus reading light L emitted from the light source 20 only in an auxiliary scanning direction (i.e., in the direction indicated by the arrow X). A film cassette 36, which holds therein an original F bearing image information recorded thereon, is disposed between the condenser lenses 28a and 28b and the reading lens 30.

The numerical aperture $NA_1$ of the reading lens 30 and the numerical aperture $NA_1$ of each of the condenser lenses 28a and 28b are set so as to meet the following inequality:

$$NA_1 < NA_2$$

The filter 66 is set in such a manner that the light transmittance in the region 66a corresponding to the numerical aperture $NA_1$ of the reading lens 30 is smaller than the light transmittance in the peripheral region 66b of the filter 66. The light transmittance in the filter 66 is set to have a distribution illustrated in FIG. 11, for example, assuming, as shown in FIG. 12, that $\Theta_1$ is the eccentric angle about the optical axis when the boundary between the regions 66a and 66b of the filter 66 is looked from the original F through the condenser lenses 28a and 28b, and $\Theta_2$ is the eccentric angle about the optical axis when an effective periphery of the region 66b of the filter 66 is looked from the original F through the condenser lenses 28a and 28b. The numerical aperture $NA_2$ is made variable within a range from 0.05 to 0.4 by varying the brightness diaphragm 67.

Operations and advantageous effects of the optical apparatus for image scanning according to the third embodiment, basically constructed as described above, will next be described.

The reading light L emitted from the light source 20 is concentrated in the auxiliary scanning direction (i.e., in the direction indicated by the arrow X) through the auxiliary condenser lenses 62a and 62b, and introduced into the filter 66 through the field diaphragm 64.

Figure 11:
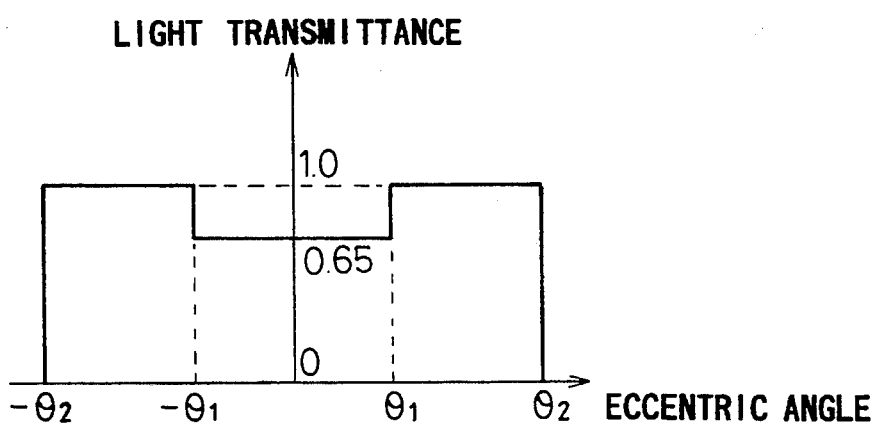
FIG. 11 is a view for describing a characteristic of a filter employed in the optical apparatus for image scanning shown in FIG. 10.
Figure 12:
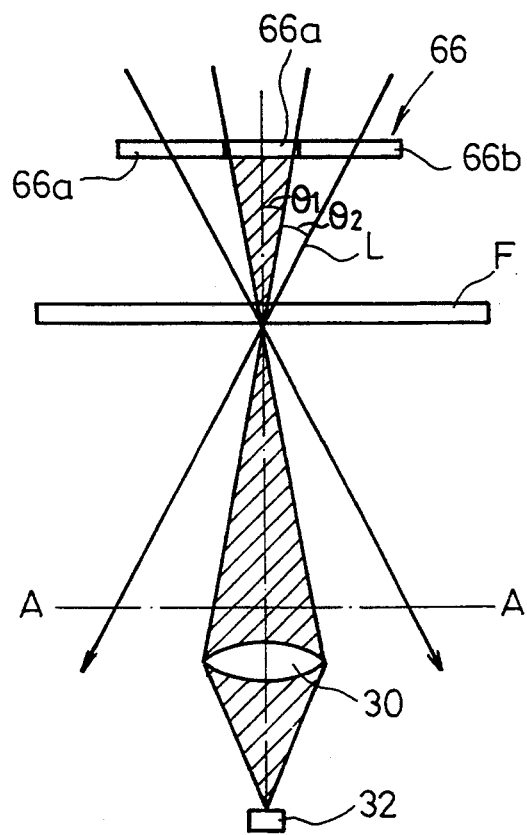
FIG. 12 is a view for describing the operation of a principal part of the optical apparatus for image scanning shown in FIG. 10.

If the filter 66 has the light-transmittance characteristic shown in FIG. 11, then the reading light L, which has passed through the central portion 66a of the filter 66, is dimmed to 65% and introduced into the condenser lenses 28a and 28b. Each of the condenser lenses 28a and 28b serves to focus the reading light L at the original F through the support glass plate 34a. When the original F has none of scratches or the like, the reading light L, which has passed through the original F and the support glass plate 34b, is introduced into the reading lens 30 with image information and then concentrated at the CCD line sensor 32. Then, the CCD line sensor 32 converts the reading light L into an electric signal and transfers the electric signal to an unillustrated image processing circuit of the image scanning apparatus as image data.

Assuming, on the other hand, that the filter 66 has the light-transmittance characteristic shown in FIG. 11, the reading light L, which has passed through the peripheral region 66b of the filter 66, is transmitted through the filter 66 without being dimmed. Thereafter, the reading light L is partly eclipsed by the brightness diaphragm 67 and introduced into the condenser lenses 28a and 28b. Next, the reading light L is focused at the original F in the same manner as described above and the light L transmitted through the original F is introduced into the reading lens 30. In this case, the numerical aperture $NA_1$ of the reading lens 30 is set so as to correspond to the region 66a of the filter 66. Therefore, if there exists no scratch in the original F nor in the support glass plates 34a, 34b and others, and if the reading light L travels with its optical path unchanged, then only the reading light L which has been transmitted through the region 66a of the filter 66 is introduced into the CCD line sensor 32, as shown in a simplified view of FIG. 12.

Figure 13:
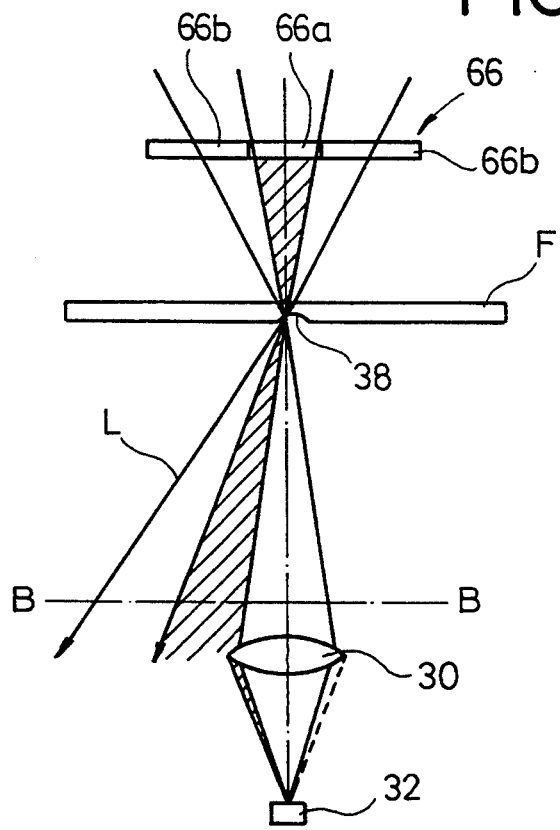
FIG. 13 is a view for describing another operation of the principal part of the optical apparatus for image scanning shown in FIG. 10.

Another description will next be made of the third embodiment in which the original F has a scratch 38 as shown in FIG. 13.

Figure 14:
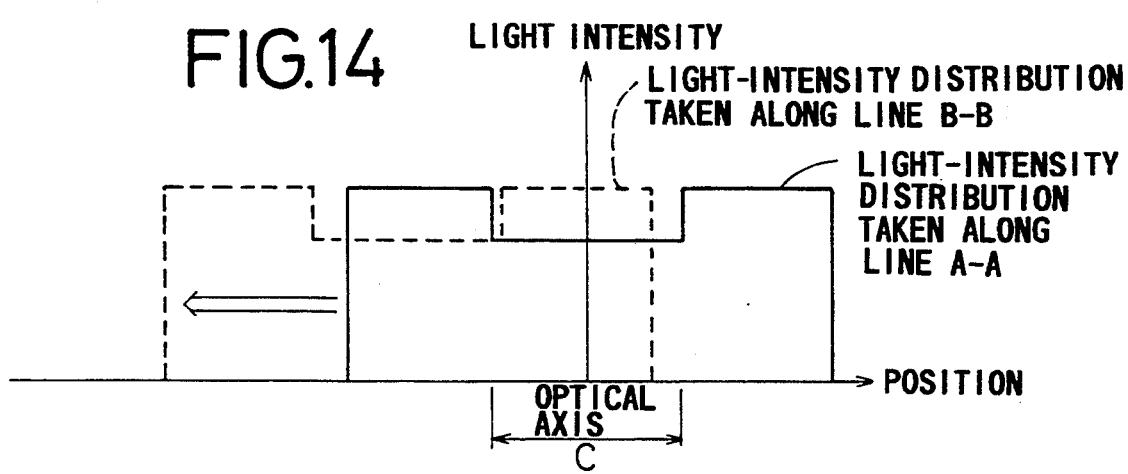
FIG. 14 is a view for describing the distribution of the quantity of light obtained in the optical apparatus for image scanning shown in FIG. 10.

Reading light L, which enters into the original F, is transmitted through the original F while its optical path is being refracted by the scratch 38, and guided to the reading lens 30. In this case, a part of the reading light L transmitted through the region 66a of the filter 66 which has a low light transmittance, reaches the reading lens 30, whereas another part of the reading light L transmitted through region 66b whose light transmittance is high, also reaches the reading lens 30. A light-intensity distribution at line B—B in FIG. 13 is indicated by the broken line in FIG. 14. A light-intensity distribution at line A—A in FIG. 12 in the case where the original F has no scratch is indicated by the solid line in FIG. 14. Now assume that a light-receiving region of the reading lens 30 is C, then, the total intensity of light entering the reading lens 30 is represented by an integral of the light-intensity distribution curve with respect to the region C, and it is understood that respective integrals for the solid line and the dotted line in FIG. 14 are substantially equal. That is, the total intensity of light entering the reading lens 30 remains almost constant irrespective of whether there is the scratch 38 on the original F, if the filter 66 is used.

Figure 15:
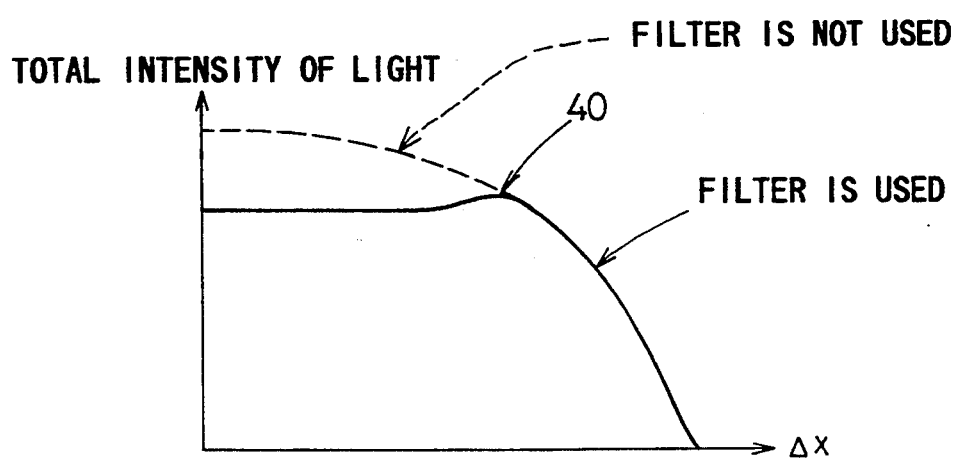
FIG. 15 is a view for describing a light-quantity characteristic obtained in the optical apparatus for image scanning shown in FIG. 10.

FIG. 15 is a graph for describing characteristics of the total light intensity with respect to $\Delta x$, a shift in the optical axis of the reading light L due to the scratch, in which a solid line represents a case where the filter 66 is used, and a dotted line corresponds to a case where no filter is used. It is understood that variation in the total light intensity with respect to the shift in the optical axis of the reading light L can be greatly reduced by using the filter 66. As a result, the reading light L can reach the CCD line sensor 32 with a reduced influence of the scratch 38, and an image on the original F can be read satisfactorily.

When the filter 66 having the aforementioned characteristic is used, a total light intensity characteristic curve shown by solid line in FIG. 15 can be obtained, which shows a point 40 where the curve slightly rises immediately before the total light intensity starts to drop. This rising point 40 has an effect that the range in which the total light intensity is maintained substantially constant is widened, and accordingly, in the case where there is a readily-noticeable scratch 38, the contrast of the scratch 38 is reduced and made nonprominent.

FIGS. 16A and 16B are graphs respectively showing the relationship between surface roughness in the scratches 38 and the intensity of light transmitted through the original F having the scratch 38. The surface roughness of the scratches 38 is indicated by the broken lines in the lower parts of the respective drawings and resultant intensity of light obtained by simulation are indicated by the solid lines in the upper parts of the respective drawings.

FIG. 16A shows result of a simulation with respect to the light intensity in which the numerical aperture $NA_2$ of each of the condenser lenses 28a and 28b is set to 0.4 and the numerical aperture $NA_1$ of the reading lens 30 is set to 0.1 without using the filter 66. FIG. 16B shows result of a simulation with respect to the light intensity in which the numerical aperture $NA_2$ of each of the condenser lenses 28a and 28b is set to 0.4 and the numerical aperture $NA_1$ of the reading lens 30 is set to 0.1 where the filter 66 is used.

By comparing the simulation results, it reveals that the scratch 38 appears as it is in FIG. 16A in which no filter 66 is used, whereas the influence of the scratch 38 is greatly reduced in FIG. 16B in which the filter 66 is used.

The above-described advantages were actually confirmed in a test described below. As the condenser lenses 28a and 28, cylindrical lenses each having a focal length f of 7.5 mm, a width of 10 mm and a length of 200 mm were used. As the filter 66, there was used one wherein a stripe-shaped dimming region was formed on a glass substrate by chrome deposition.

In the test, good results were obtained with a filter density D falling within a range from 0.1 to 0.4 and a stripe width W falling within a range from 1 mm to 4 mm. Satisfactory results were obtained in particular with the filter density D and the stripe width W falling within a range from 0.15 to 0.3 and a range from 1.5 mm to 2.5 mm, respectively.

In each of the aforementioned embodiments, the reduced influence of the unevenness like the scratch 38 on the original F has been described. However, it is also possible to reduce the influence of the scratch or the like developed in the support glass plates 34a and 34b on the image in the same manner as described above.

The same results as in each of the aforementioned embodiments can be obtained in the case where the reading light L reflected by the original F is received and converted by the CCD line sensor 32.

Figure 17:
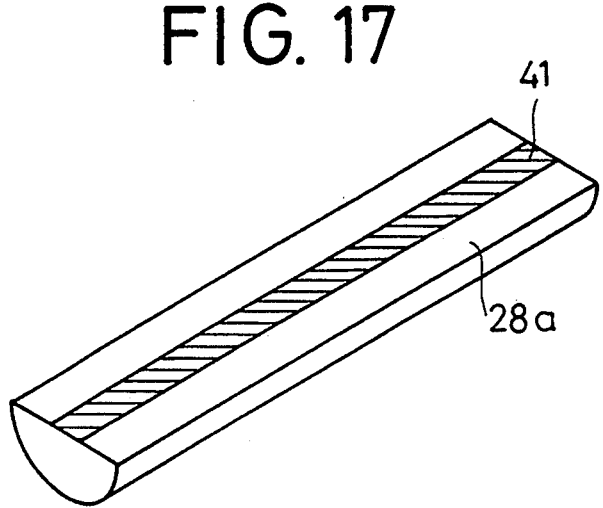
FIG. 17 is a view for illustrating another example of the filter employed in the optical apparatus for image scanning depicted in FIG. 10.

As an alternative to the filter 66, a filter may be used in which a mat 41 having the same dimming characteristic as that of the region 66a of the filter 66 is formed on the upper surface of the condenser lens 28a by chemical processing or polishing or the like as shown in FIG. 17. A desired light transmittance can also be obtained by shaping the mat 41 in the form of an areal pattern such as halftone dots or the like.

Figure 18:
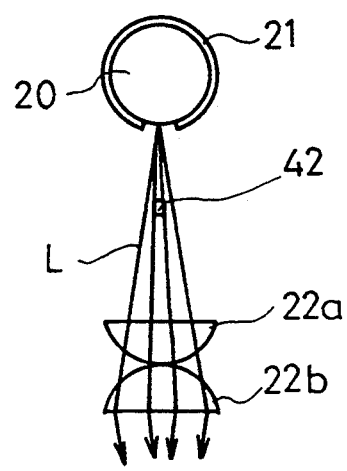
FIG. 18 is a view for describing a further example of the filter employed in the optical apparatus for image scanning shown in FIG. 10.

The filter 66 may also be used as a distributed density filter that is inserted between the light source 20 and the auxiliary condenser lens 62a, or the filter 66 may also be used for a light-intransmissive member 42 which extends in a main scanning direction and completely dims the light passing through a region adjacent to the optical axis of the light source 20 as shown in FIG. 18.

Figure 19:
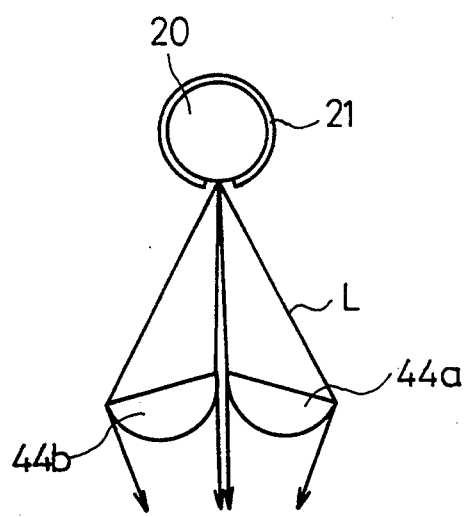
FIG. 19 is a view for describing a still further example of the filter employed in the optical apparatus for image scanning shown in FIG. 10.

Further, a portion which passes a dimmed reading light L may be formed by disposing two auxiliary condenser lenses 44a and 44b so as to be spaced a predetermined interval from each other in an auxiliary scanning direction as shown in FIG. 19. In this configuration, the interval thus formed can also bring about the same effects as those obtained by the filter 66.

Figure 20:
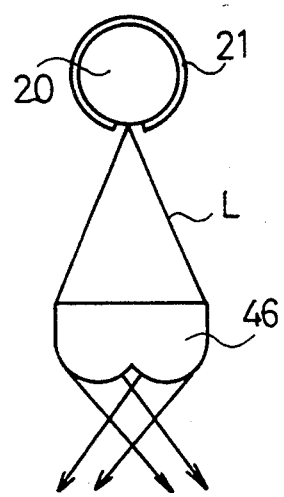
FIG. 20 is a view for describing a still further example of the filter employed in the optical apparatus for image scanning depicted in FIG. 10.

Moreover, the intensity of light transmitted through the central region of an auxiliary condenser lens 46 can also be dimmed by making use of the auxiliary condenser lens 46 having a recess defined between two convex portions thereof as illustrated in FIG. 20.

It is desirable to prepare a plurality of the above-described filters having different light-transmittance distributions and to use the optimum one selectively according to the magnification employed in the optical apparatus for image scanning. It is possible to construct a filter having a matrix of liquid crystal cells disposed over the entire region of the filter, in which each of the liquid crystal cells is capable of being selectively controlled so as to be light-transmissive or light-intransmissive. In this type of filter, the light-transmittance distribution can be adjusted by controlling a pattern in which the liquid crystal cells are light-transmissive. Further, filters having predetermined light-transmittance distributions are respectively disposed so as to correspond to a plurality of optical paths, which may be, in turn, selected as needed.

The optical apparatus for image scanning according to the present invention can bring about the following advantageous effects.

The width of reading light can be easily set to near the width of each photoelectric converter element of a photoelectric conversion means by limiting the width spreading in an auxiliary scanning direction, of the reading light using a slit member and condenser means A and B. It is therefore possible to avoid the occurrence of the flare and to accurately reproduce the original having high density regions. The influence of scratches, dust, etc. on an image can be reduced by irradiating the original with the reading light corresponding to a beam of light focused by the condenser means A and concentrating the transmitted light by the condenser means B having the numerical aperture smaller than that of the condenser means A, thereby making it possible to obtain a satisfactory image.

When a filter is placed in a predetermined position between the slit member and the condenser means B in order to set the numerical aperture of the condenser means B equal to or larger than that of the condenser means A over a predetermined wavelength of reading light, a process for avoiding the influence of scratches, dust, etc. on an image can be effected over a desired wavelength alone. Thus, if a filter which transmits the yellow (Y) light and does not transmit the blue (B) light, is used, for example, it is then possible to make the coarseness of yellow particles on a film nonprominent and to exclude the influence of scratches, dust, surface roughness, etc. on an image.

The intensity of the reading light entering into a predetermined region of a filter is decreased and irradiated to the original. Then, the transmitted or reflected light is focused by a condenser means B having the numerical aperture corresponding to the predetermined region of the filter and introduced into a photoelectric conversion means. In this configuration, When a region larger than the predetermined region of the filter is made light-transmissive, the reading light incident on the original through the light-transmissive region of the filter compensates for the decreased light intensity, and it is possible to obtain a suitable image without making the scratch prominent, even when the original, for example, has a scratch or the like which refracts the transmitted or reflected light.

Having now fully described the invention, it will be apparent to those skilled in the art that many changes and modifications can be made without departing from the spirit or scope of the invention as set forth herein.

What is claimed is:

1. An optical apparatus for image scanning comprising:
   a light source for irradiating an original having image information recorded thereon with reading light;
   a slit for controlling a region of said original to be irradiated with said reading light, disposed between said light source and said original;
   condenser means A for concentrating said reading light transmitted through said slit at a region of said original to be read, disposed between said slit and said original;
   photoelectric conversion means for receiving said reading light from said original and converting received reading light into an electric signal; and
   condenser means B for concentrating said reading light from said original at said photoelectric conversion means, disposed between said original and said photoelectric conversion means.

2. An optical apparatus for image scanning according to claim 1, wherein the numerical aperture of said condenser means B is set smaller than the numerical aperture of said condenser means A.

3. An optical apparatus for image scanning according to claim 1, wherein a filter A is disposed at a predetermined position between said slit and said condenser means A so as to make the numerical aperture of said condenser means A, with respect to a reading light component within a predetermined wavelength range, at least substantially equal to the numerical aperture of said condenser means B.

4. An optical apparatus for image scanning according to claim 3, wherein said filter A comprises a light-transmissive region spreading about the optical axis of said reading light incident on said original, said light-transmissive region being transmissive to the light of an entire range of wavelength, and a light-intransmissive region spreading in a region other than said light-transmissive region of said filter A, said light-intransmissive region being intransmissive to the light having the wavelength within a predetermined wavelength range.

5. An optical apparatus for image scanning comprising:
   a light source for irradiating an original with image information recorded thereon with reading light;
   first condenser means for concentrating said reading light;
   second condenser means for concentrating said reading light at said original, having a front focal point at a point where said reading light is converged by said first condenser means;
   a filter for controlling a spatial distribution of the intensity of said reading light, disposed between said light source and said original;
   photoelectric conversion means for receiving said reading light from said original and converting said received light into an electric signal; and
   third condenser means for concentrating said reading light from said original at said photoelectric conversion means, disposed between said original and said photoelectric conversion means.

6. An optical apparatus for image scanning according to claim 5,
   wherein said filter comprises a dimming region spreading within a predetermined region about the optical axis of said reading light incident on said original and having a predetermined dimming characteristic, and a light-transmissive region which is other than said dimming region of said filter, and
   wherein said third condenser means has a numerical aperture which is not greater than the numerical aperture substantially corresponding to said dimming region of said filter.

7. An optical apparatus for image scanning according to claim 5, wherein said filter comprises a pattern having a predetermined light-transmissive characteristic formed on one of said first and second condenser means.

8. An optical apparatus for image scanning according to claim 5, wherein said filter is disposed between said light source and said original and comprises a light-intransmissive member for shielding the reading light entering into a predetermined region of said filter.

9. An optical apparatus for image scanning according to claim 5, wherein said filter is constructed by disposing and spacing two convex lenses to each other symmetrically about an axis of an optical system including said light source and said original, in such a manner that said convex lenses divide the reading light into two portions, one of which passes through said convex lenses and the other passes through an interval between said convex lenses.

10. An optical apparatus for image scanning according to claim 5, wherein said filter is constructed by disposing two convex lenses symmetrically about an axis of an optical system including said light source and said original, and merging said convex lenses together at their peripheries, in such a manner that said convex lenses divide the reading light into two portions, one of which passes through said convex lenses and the other passes through a part where said convex lenses are merged with each other.

11. An optical apparatus for image scanning comprising:
   a light source for irradiating an original having image information recorded thereon with reading light;
   a filter for controlling a spatial distribution of the intensity of said reading light, disposed between said light source and said original, said filter comprising a dimming region spreading within a predetermined region about the optical axis of said reading light incident on said original and having a predetermined dimming characteristic, and a light-transmissive region which is other than said dimming region of said filter;
   photoelectric conversion means for receiving said reading light from said original and converting said received light into an electric signal; and
   condenser means for concentrating said reading light from said original at said photoelectric conversion means, disposed between said original and said photoelectric conversion means, and having a numerical aperture which is not greater than the numerical aperture substantially corresponding to said dimming region of said filter.

* * * * *